United States Patent
Okazawa (10) Patent No.: US 10,602,016 B2
(45) Date of Patent: Mar. 24, 2020

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Takashi Okazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/284,853

(22) Filed: Feb. 25, 2019

(65) Prior Publication Data
US 2019/0320083 A1 Oct. 17, 2019

(30) Foreign Application Priority Data
Apr. 13, 2018 (JP) .................. 2018-077926

(51) Int. Cl.
*H04N 1/32* (2006.01)
*H04N 1/44* (2006.01)
*G06F 3/12* (2006.01)
*G06K 15/02* (2006.01)

(52) U.S. Cl.
CPC ..... *H04N 1/32272* (2013.01); *H04N 1/32283* (2013.01); *H04N 1/4413* (2013.01)

(58) Field of Classification Search
None
See application file for complete search history.

(56) References Cited

U.S. PATENT DOCUMENTS

| 2005/0281405 A1* | 12/2005 | Uchikawa | G06F 21/608 380/51 |
| 2007/0024893 A1* | 2/2007 | Hosoda | G06F 21/608 358/1.14 |
| 2008/0022137 A1* | 1/2008 | Ginter | G06F 21/10 713/194 |
| 2013/0061041 A1* | 3/2013 | Inoue | G06F 21/44 713/156 |
| 2015/0296099 A1* | 10/2015 | Ferreira | H04N 1/4413 358/1.14 |
| 2016/0373606 A1* | 12/2016 | Ito | H04N 1/32106 |
| 2017/0280005 A1* | 9/2017 | Matsuda | H04N 1/32448 |
| 2018/0285579 A1* | 10/2018 | Viswanathan | G06F 21/608 |

FOREIGN PATENT DOCUMENTS

JP    2010-171473 A    8/2010

* cited by examiner

Primary Examiner — Beniyam Menberu
(74) Attorney, Agent, or Firm — Canon U.S.A., Inc. IP Division (57) ABSTRACT

Ability information about an authentication printing function to be transmitted from a printing apparatus to a print client is varied depending on whether a communication path between the apparatuses is encrypted.

8 Claims, 7 Drawing Sheets

Query/response: IPP Response
Status-code: successful-ok
Printer-attribute-tag
-printer-state: idle
-document-format-support: pdf/jpeg
-media_type: auto
-print_wfds: TRUE
-mopria_certified: 1.2
-pin-print-support: NONE
-finishing-support: TRUE
...OMITTED

FIG.4B

Query/response: IPP Response
Status-code: successful-ok
Printer-attribute-tag
-printer-state: idle
-document-format-support: pdf/jpeg
-media_type: auto
-print_wfds: TRUE
-mopria_certified: 1.2
-pin-print-support: TRUE
-pin-hash-algorism: SHA2
-finishing-support: TRUE
...OMITTED

PRINTING APPARATUS, CONTROL METHOD FOR PRINTING APPARATUS, AND STORAGE MEDIUM

BACKGROUND

Field of the Disclosure

The present disclosure relates to a printing apparatus that prints an image on a sheet based on received print data.

Description of the Related Art

A printing apparatus that receives print data from a communication apparatus via a network and prints an image on a sheet based on the received print data is known. In addition, in recent years, generation of print data without intervention of a printer driver (or a print application) designed to use an individual printing apparatus has been known. For example, the following technique is known. First, print data is generated by a general-purpose print client provided as a function of an operating system (OS) of a communication apparatus, or a general-purpose print client provided by an apparatus such as a print server on the cloud. The generated print data is then transmitted to a printing apparatus. Such a general-purpose print client has a mechanism for performing printing based on a network protocol (Internet Printing Protocol (IPP)) for enabling a printing apparatus to execute printing. A printing apparatus and a communication apparatus perform communications based on this protocol to execute printing.

Japanese Patent Application Laid-Open No. 2010-171473 discusses transmission of print data based on a network protocol such as IPP to an image processing apparatus found on a network by searching.

SUMMARY

According to some embodiments, a printing apparatus includes a reception control unit configured to receive a request for acquisition of attribute information of the printing apparatus from a communication apparatus, and a transmission control unit configured to perform control so as to transmit, to the communication apparatus, attribute information that includes at least information indicating that authentication printing using a password is supported, in response to a reception of a request for acquisition of the attribute information of the printing apparatus from the communication apparatus via an encrypted communication path, as a response to the request, and configured to perform control so as to transmit, to the communication apparatus, attribute information that includes at least information indicating that the authentication printing is not supported, in response to a reception of at least a request for acquisition of the attribute information of the printing apparatus from the communication apparatus via an unencrypted communication path, as a response to the request.

Further features various embodiments will become apparent from the following description of exemplary embodiments with reference to the attached drawings.

DESCRIPTION OF THE EMBODIMENTS

In a case where printing is performed using a general-purpose print client compliant with the Internet Printing Protocol (IPP), the print client provides a function conforming to the ability of a printing apparatus, based on ability information received beforehand from the printing apparatus. For example, in a print system using IPP, a function of performing secure printing (also referred to as "authentication printing function") is defined. In a case where the authentication printing function is used, the print client transmits a print job including a password, such as a personal identification number (PIN) code set by a user, to the printing apparatus. Upon receiving the print data including the password, the printing apparatus performs control so as not to perform printing until the password is input into an operation unit of the printing apparatus.

In this case, the printing apparatus that supports the authentication printing function of IPP transmits information indicating that the authentication printing function is supported and indicating an algorithm that supports hashing of the password in authentication printing, as the ability information.

Further, in a case where the authentication printing function is used, in general, a print client hashes a password, such as a PIN code, based on a hash algorithm supported by a printing apparatus and transmits the hashed password. However, there is a case where hashing of a password to be used for the authentication printing function is not supported, depending on the type or version of a print client. In a case where authentication printing is to be performed in such a print client, there is a possibility that a plaintext password not being hashed may flow on a communication path, posing a security issue.

Various embodiments solve at least one of the above-described issues. Some embodiments are directed to varying ability information about an authentication printing function to be transmitted from a printing apparatus to a print client, depending on whether a communication path between the apparatuses is encrypted. Some embodiments also appropriately vary ability information about an authentication printing function to be transmitted from a printing apparatus to a print client at the other end, depending on the encryption status of a communication path and the type of the print client at the other end.

Some embodiments also increase a security level by varying the availability of an authentication printing function, depending on whether a communication path between apparatuses is encrypted. Further, some embodiments provide a mechanism for appropriately varying ability information about an authentication printing function to be transmitted from a printing apparatus to a print client at the other end, depending on the encryption status of a communication path and the type of the print client at the other end.

Exemplary embodiments will be described below with reference to the drawings. The following exemplary embodiments are not intended to limit all embodiments according to the scope of claims, and not all combinations of features to be described in the exemplary embodiments are necessary for a solution in every embodiment.

Figure 1:
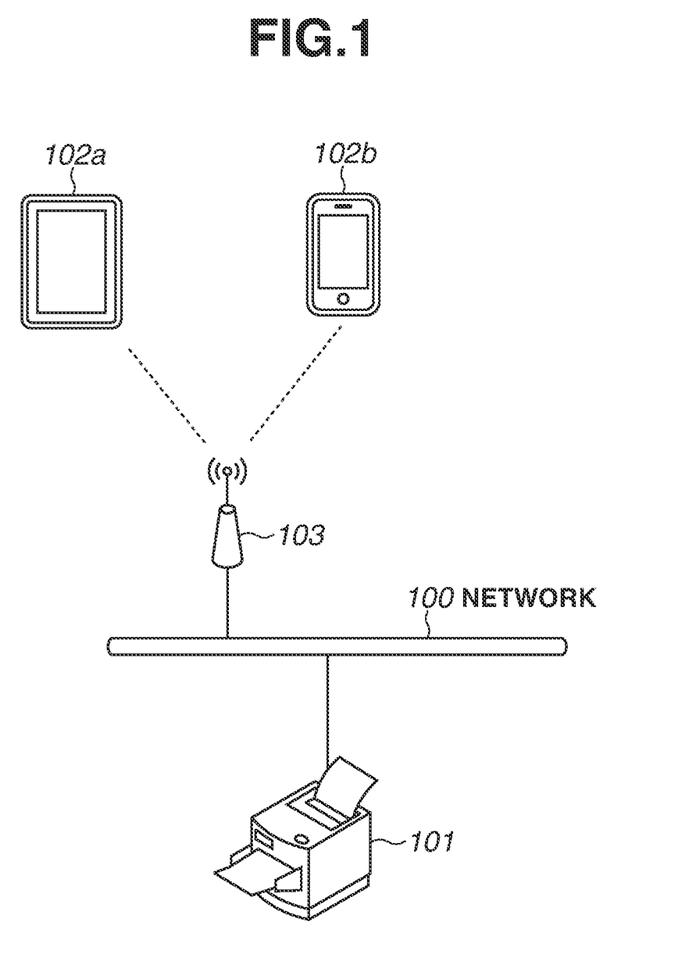
FIG. 1 is a diagram illustrating an example of a print system.

First, a configuration of a print system according to a first exemplary embodiment will be described with reference to FIG. 1. The print system according to the present exemplary embodiment includes communication apparatuses 102a and 102b (hereinafter, sometimes collectively referred to as the communication apparatus 102), a multi-function peripheral (MFP) 101, and an access point (AP) 103. On a network 100, the MFP 101 and the AP 103 are connected to be able to communicate with each other. In the present exemplary embodiment, the MFP 101 will be described as an example of a printing apparatus. Further, each of the communication apparatuses 102a and 102b will be described as an example of a communication apparatus. In the present exemplary embodiment, a case where each of the communication apparatuses 102a and 102b is a mobile terminal, such as a smartphone or a tablet terminal, is described as an example. The communication apparatus 102 may be a communication apparatus such as a personal computer (PC).

The communication apparatuses 102a and 102b can each communicate with the MFP 101 on the network 100 via the AP 103. In a case where the communication apparatus 102 is a PC, the communication apparatus 102 may have a connection configuration for communicating with the MFP 101 by connecting to the network 100 via a local area network (LAN) cable.

In the present exemplary embodiment, the above-described configuration is described as an example of the print system, but the print system is not limited to this configuration. It is only necessary that one or more communication apparatuses and a printing apparatus are connected via a network to be able to communicate with each other. The communication via the AP 103 is, for example, wireless communication compliant with the Institute of Electrical and Electronics Engineers (IEEE) 802.11 series. Further, the communication apparatus 102 and the MFP 101 can communicate with each other in direct wireless communication via an ad hoc network, such as Wi-Fi Direct® or Wi-Fi Aware®.

First, the MFP 101 will be described. The MFP 101 has a reading function of reading an image on a document and a print function of printing an image on a sheet. The MFP 101 can execute print processing based on print data received via a network. The MFP 101 further has a personal identification number (PIN) printing function. The PIN printing function stores print data in which a password, such as a PIN code, is set on the host side (communication apparatus side) into a storage, and holds printing until the password, such as a PIN code, is input via an operation unit of the MFP 101.

Figure 2:
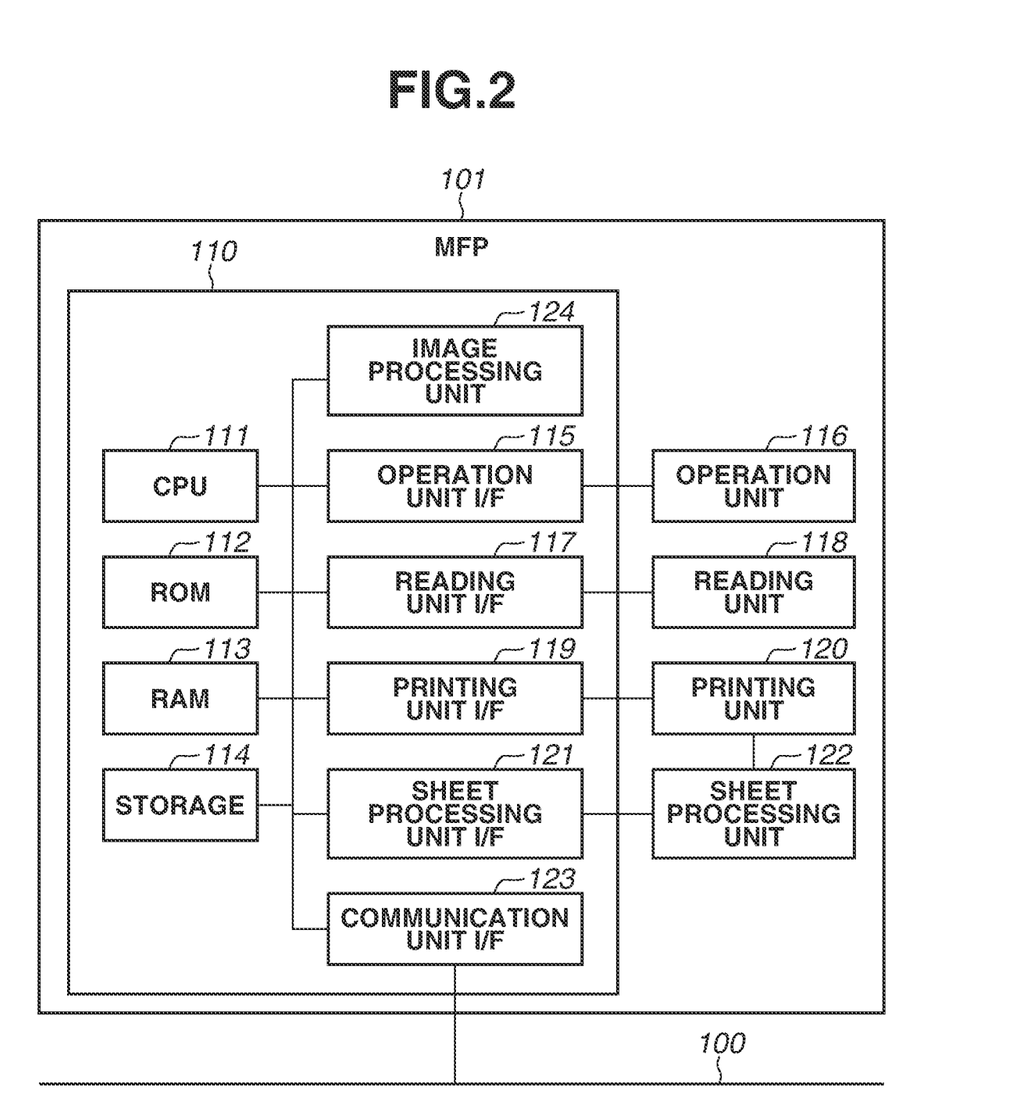
FIG. 2 is a block diagram illustrating an example of a hardware configuration of a multi-function peripheral (MFP).

FIG. 2 is a block diagram illustrating a hardware configuration of the MFP 101. The MFP 101 has a reading function of reading an image on a sheet and a print function of printing an image on a sheet. The MFP 101 also has other functions, including a file transmission function of transmitting image data to an external communication apparatus.

In the present exemplary embodiment, the MFP 101 is described as an example of a printing apparatus, but the printing apparatus is not limited to this example. For example, the printing apparatus may be a printing apparatus such as a single function peripheral (SFP) not having a reading function.

A control unit 110 includes a central processing unit (CPU) 111 and controls operation of the entire MFP 101. The CPU 111 performs various kinds of control, such as print control and reading control, by reading out a control program stored in a read only memory (ROM) 112 or a storage 114. The ROM 112 stores a control program that can be executed by the CPU 111. A random access memory (RAM) 113 is a main storage memory of the CPU 111 and is used as a work area or a temporary storage area for executing various control programs. The storage 114 stores print data, image data, various programs, and various kinds of setting information. In the present exemplary embodiment, the storage 114 is assumed to be an auxiliary storage device, such as a hard disk drive (HDD), but a nonvolatile memory, such as a solid state drive (SSD), may be used in place of the HDD. In this way, pieces of hardware, including the CPU 111, the ROM 112, and the RAM 113, are used to configure a computer.

In the MFP 101 according to the present exemplary embodiment, the one CPU 111 executes each operation illustrated in flowcharts to be described below, using one memory (RAM 113), but other modes may be adopted. For example, each operation illustrated in the flowcharts to be described below can be executed by cooperation of a plurality of CPUs, RAMs, ROMs, and storages. Further, some of the operations may be executed using a hardware circuit, such as an application specific integrated circuit (ASIC) or a field-programmable gate array (FPGA).

An operation unit interface (I/F) 115 connects an operation unit 116 and the control unit 110. The operation unit 116 includes a liquid crystal display having a touch panel function and various hardware keys, and the operation unit 116 serves as a display unit for displaying information and a receiving unit for receiving an instruction of a user.

A reading unit I/F 117 connects a reading unit 118 and the control unit 110. The reading unit 118 generates a read image by reading a document. The generated read image is stored into the storage 114 or the RAM 113. The read image generated by the reading unit 118 may be transmitted to a communication apparatus and used for printing of an image on a sheet.

An image processing unit 124 includes a raster image processor (RIP) that generates a print image by rasterizing print data received via a network. A printing unit I/F 119 connects a printing unit 120 and the control unit 110. The print image generated by analyzing the print data by the image processing unit 124 is transferred from the control unit 110 to the printing unit 120 via the printing unit I/F 119. The printing unit 120 receives a control command and the print image data from the control unit 110 and prints an image based on this image data on a sheet fed from a feeding cassette (not illustrated). The printing method of the printing unit 120 may be an electrophotographic method or may be an inkjet method. Other printing methods, including a thermal transfer method, are also applicable. A sheet processing unit I/F 121 connects the control unit 110 and a sheet processing unit 122. The sheet processing unit 122 receives a control command from the CPU 111 and performs post processing on a sheet printed by the printing unit 120, based on the control command. For example, the sheet processing unit 122 executes the post processing, such as aligning a plurality of sheets, punching a hole in a sheet, and binding a plurality of sheets.

Further, the control unit 110 is connected to the network 100 via a communication unit I/F 123. The communication unit I/F 123 transmits image data and information to a communication apparatus on the network 100, and the communication unit I/F 123 receives print data and information from a communication apparatus on the network 100.

Referring back to FIG. 1, the communication apparatuses 102a and 102b will be described. The communication apparatuses 102a and 102b each include a print client compliant with IPP. The print client has a function of searching for a printing apparatus and receiving print setting for print data. Further, the print client has a function of transmitting print data to a desired printing apparatus.

Meanwhile, in a case where printing is performed using a general-purpose print client compliant with IPP, the print client provides a function conforming to the ability of a printing apparatus, such as the MFP 101, based on ability information received beforehand from the printing apparatus. The MFP 101 according to the present exemplary embodiment has the PIN printing function as a function for performing secure printing (also referred to as "authentication printing function" or "secure printing function"). In the present exemplary embodiment, in a case where the authentication printing function, such as the PIN printing function, is used, the print client transmits, to the printing apparatus, a print job including a password, such as a PIN code, set by a user. Upon receiving the print data including the password, the MFP 101 performs control for not performing printing until the password is input into the operation unit of the printing apparatus. In the present exemplary embodiment, the printing apparatus that supports the authentication printing function, such as the PIN printing function, transmits information indicating that the authentication printing function is supported and indicating an algorithm that supports hashing of the password in authentication printing, as the ability information.

Further, in a case where the PIN printing function is used, in general, a print client hashes a password, such as a PIN code, based on a hash algorithm supported by a printing apparatus and transmits the hashed password. However, there is a case where hashing of a password to be used for the authentication printing function is not supported, depending on the type or version of a print client. In a case where authentication printing is attempted in such a print client, there is a possibility that a plaintext password not being hashed may flow on a communication path, posing a security issue.

In view of such an issue, the present exemplary embodiment provides a mechanism for varying ability information about the authentication printing function to be transmitted from a printing apparatus to a print client, depending on whether a communication path between apparatuses is encrypted. This mechanism will be specifically described below.

Figure 3:
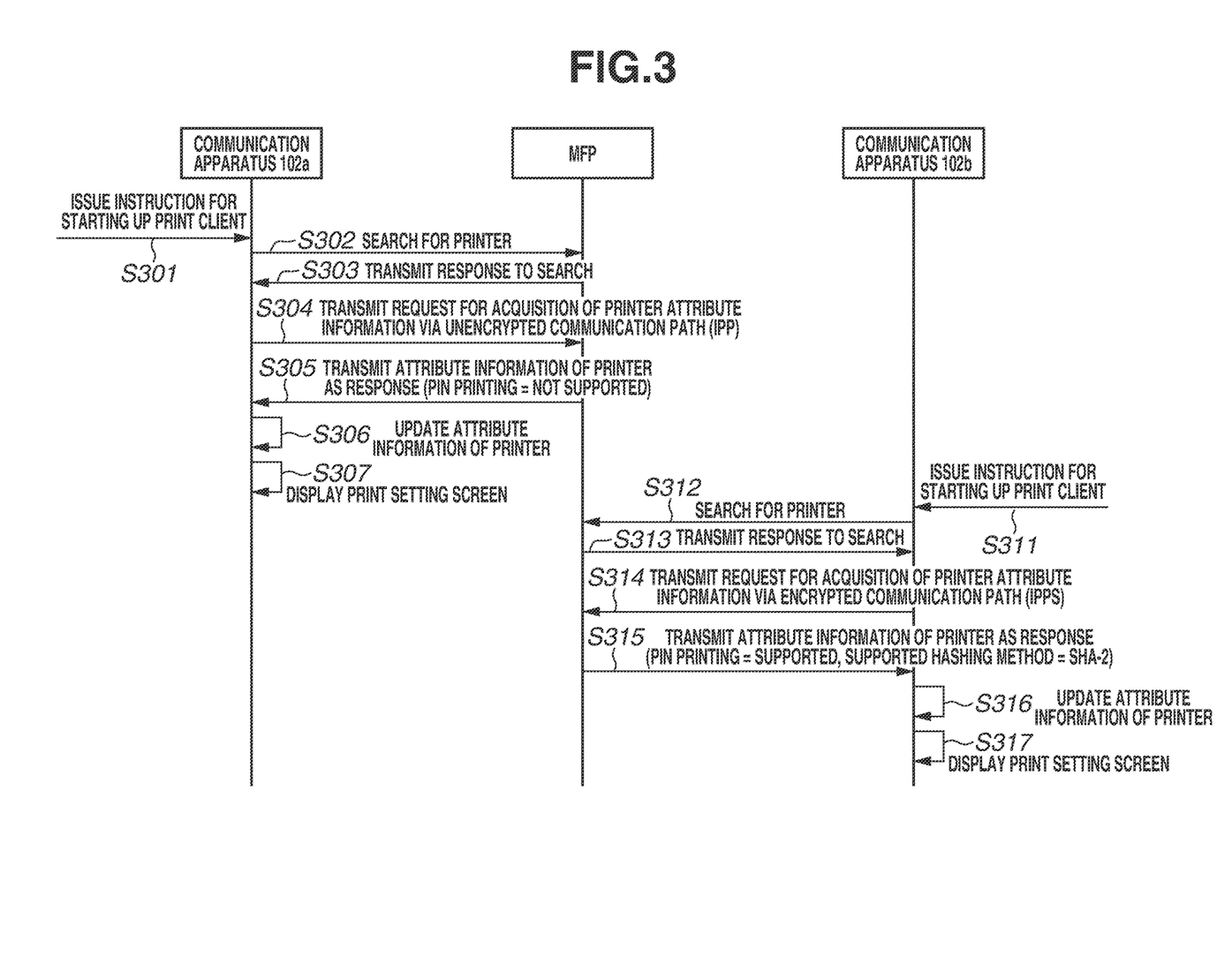
FIG. 3 is a sequence diagram illustrating an example of a processing procedure in the print system.

A communication sequence of IPP in the present exemplary embodiment will be described below. FIG. 3 is a sequence diagram illustrating an example of communication between the communication apparatus 102 and the MFP 101. Here, a print client installed in the communication apparatus 102a will be described to perform printing in compliance with IPP using an unencrypted communication path. In contrast, a print client installed in the communication apparatus 102b will be described to perform printing in compliance with IPP using an encrypted communication path. The encrypted communication path indicates that a communication path established between a communication apparatus and an image forming apparatus to perform data communication in compliance with IPP is encrypted by a protocol, such as Transport Layer Security (TLS) or Secure Sockets Layer (SSL). To perform printing in compliance with IPP using a communication path encrypted by SSL or TLS will be hereinafter referred to as "IPPS".

In S301, a user of the communication apparatus 102a performs a user operation for starting up the print client via an operation unit of the communication apparatus 102a. In S302, upon receiving the user operation for starting up the print client, the communication apparatus 102a broadcasts a search request to search for a nearby printer, such as an image forming apparatus. For example, the multicast Domain Name Service (mDNS) can be used for the search request.

In S303, upon receiving the search request, the MFP 101 transmits a response to the search. In S304, upon receiving the response from the printer, such as the MFP 101, the communication apparatus 102a transmits a request for acquisition of printer attribute information including the ability of the printer via an unencrypted communication path (IPP). The communication apparatus 102a may be configured in such a manner that, in a case where a plurality of printers is found, the communication apparatus 102a displays a selection screen (not illustrated) for confirmation of the printers and transmits the request to a printer selected via the selection screen.

At this time, the communication apparatus 102a is assumed to transmit the acquisition request to the MFP 101, using a Get-Printer-Attributes command predefined by IPP.

Figure 4A:
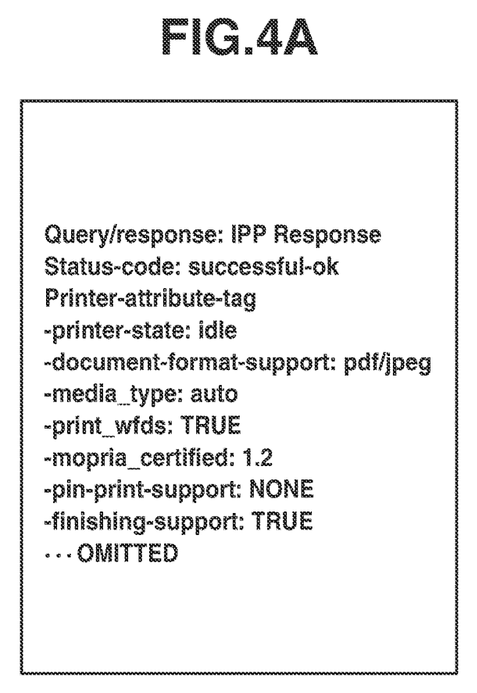
FIGS. 4A and 4B are diagrams each illustrating an example of an ability response.
Figure 4B:
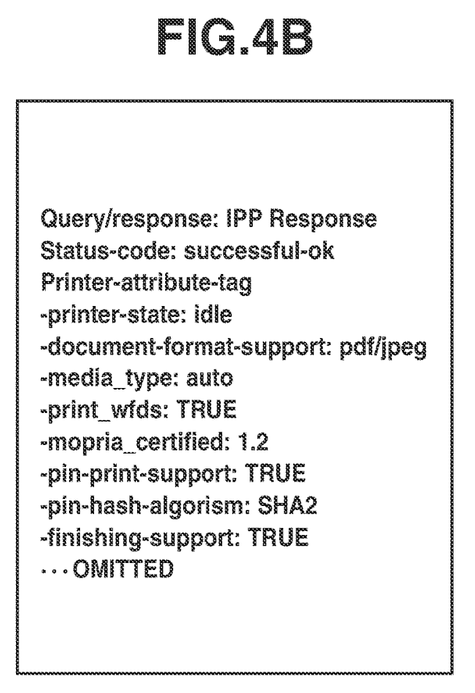

In S305, upon receiving the Get-Printer-Attributes command that is the request for acquisition of printer attribute information via the unencrypted communication path, the MFP 101 transmits the attribute information of the MFP 101 as a response to this request. The attribute information to be transmitted by the MFP 101 will be described with reference to FIGS. 4A and 4B. FIG. 4A illustrates an example of attribute information to be transmitted as a response in a case where an attribute information acquisition request is received via an unencrypted communication path. FIG. 4A illustrates printer attribute information to be transmitted as the response to 304. This printer attribute information includes information indicating a supported file type, information indicating that the PIN printing function is not supported, information indicating other printing abilities, and information indicating post processing ability. In this way, in a case where an attribute information acquisition request is received via an unencrypted communication path, the attribute information including the ability information indicating that the PIN printing function is not supported is transmitted as a response. The attribute information illustrated in each of FIGS. 4A and 4B is an example illustrated for the purpose of the description, and attribute names and attribute values are not limited to this example.

Referring back to FIG. 3, in S306, upon receiving the attribute information, the communication apparatus 102a updates the attribute information of the printer. This processing brings the print client of the communication apparatus 102a to a state where a print setting screen included in the ability of the printer can be displayed.

In S307, the communication apparatus 102a subsequently displays the print setting screen based on the attribute information updated in S306. More specifically, the print client of the communication apparatus 102a displays the print setting screen in which a setting about the PIN printing function is grayed out or hidden, based on the updated attribute information. Therefore, setting the PIN printing function can be inhibited in a case where printing based on IPP is performed in an unencrypted communication path.

Next, a case where printing based on IPP to be performed in an encrypted communication path will be described using communication with the communication apparatus 102b as an example. In S311 to S313, the communication apparatus 102b and the MFP 101 execute processing for searching for the MFP 101, like in S300 to S303. Subsequently, in S314, upon receiving a response from a printer, such as the MFP 101, the communication apparatus 102b transmits a request for acquisition of printer attribute information including the ability of the printer via an encrypted communication path (IPPS).

In S315, upon receiving a Get-Printer-Attributes command, which is the request for acquisition of printer attribute information, via the encrypted communication path, the MFP 101 transmits the attribute information of the MFP 101 as a response to this request. FIG. 4B illustrates an example of attribute information to be transmitted as a response in a case where an attribute information acquisition request is received via an encrypted communication path. FIG. 4B illustrates printer attribute information to be transmitted as the response to S314. This printer attribute information includes information indicating a supported file type, information indicating that the PIN printing function is supported, and information indicating a supported hashing method. This printer attribute information further includes information indicating other printing abilities and information indicating post processing ability. In this way, in a case where an attribute information acquisition request is received via an encrypted communication path, the attribute information including the ability information indicating that the PIN printing function is supported is transmitted as a response.

In S316 and S317, the communication apparatus 102b performs processing for updating the attribute information and processing for displaying a print setting screen, like in S306 and S307. The print client of the communication apparatus 102b displays the print setting screen in which a setting about the PIN printing function can be performed, based on the updated attribute information. A user can enable the PIN printing function via the print setting screen (not illustrated). The print client of the communication apparatus 102b generates print data, in response to receipt of an operation for start of printing after a PIN code is set via the operation unit. At this time, the print client generates hash data of the PIN code, using the hashing method supported by the MFP 101, and transmits the generated hash data together with the print data.

<Control of MFP 101>

Figure 5:
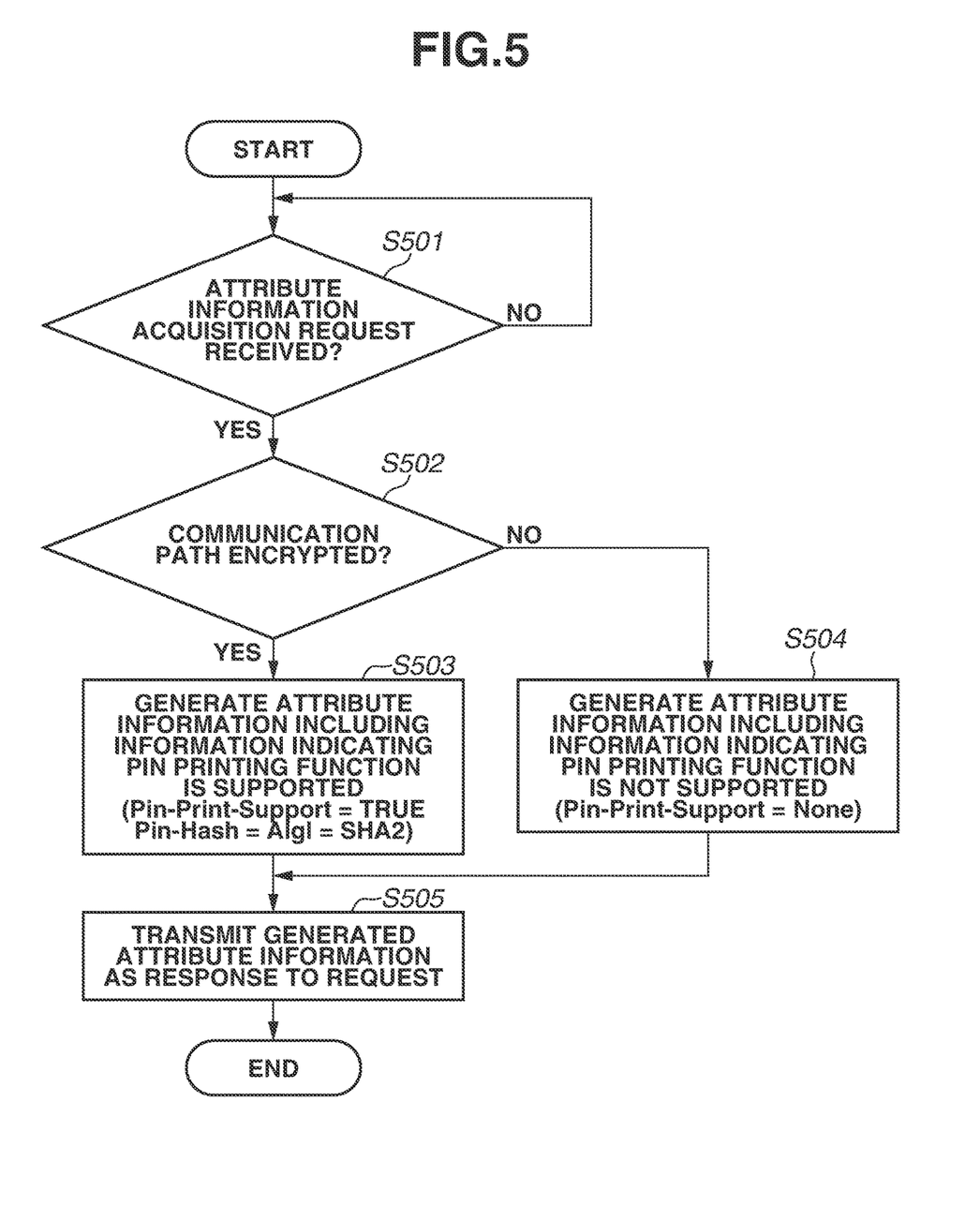
FIG. 5 is a flowchart illustrating an example of a control method performed by the MFP.
Figure 6:
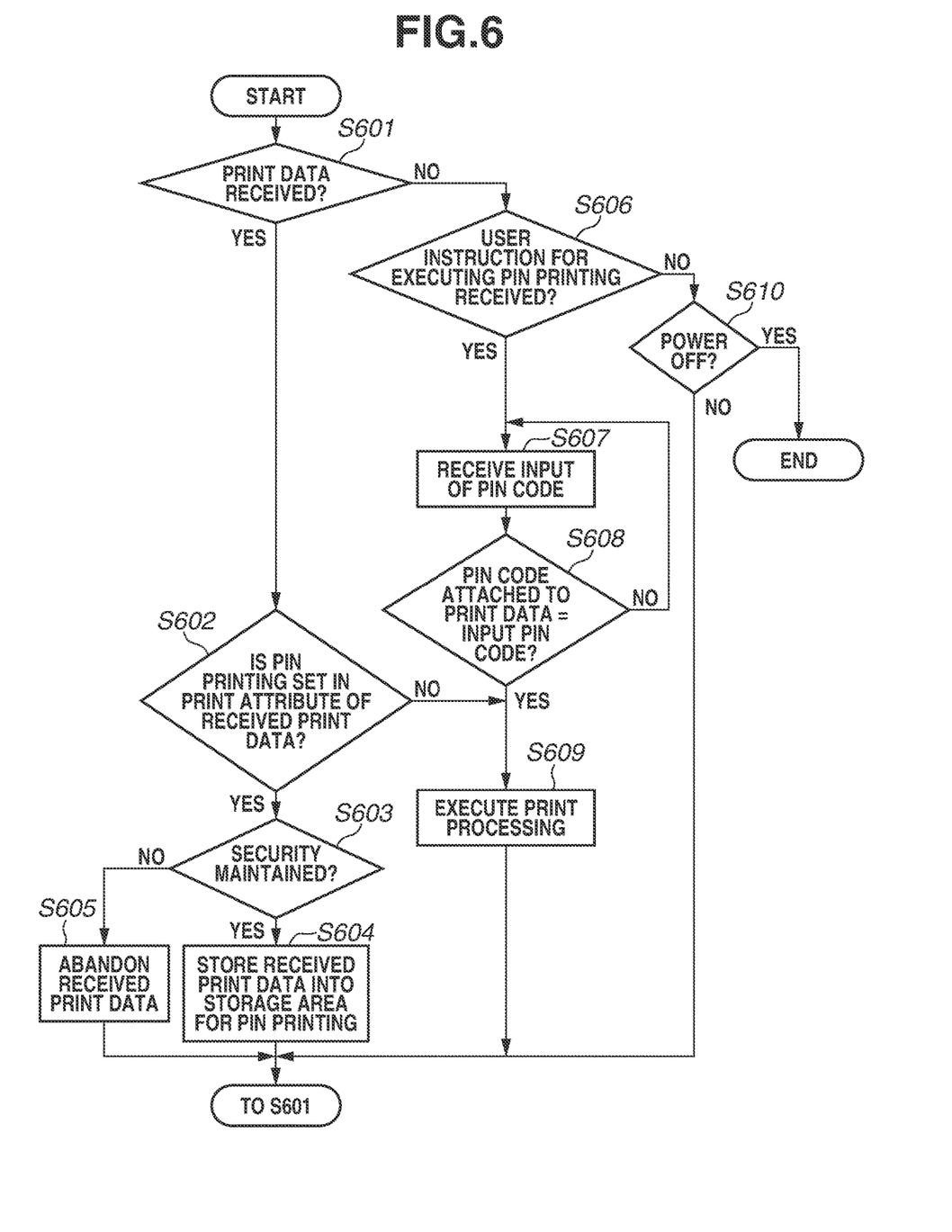
FIG. 6 is a flowchart illustrating an example of a control method performed by the MFP.

Control in the MFP 101 will be described. FIGS. 5 and 6 are flowcharts illustrating the control of the MFP 101. The CPU 111 realizes each operation (block) illustrated in the flowchart of each of FIGS. 5 and 6, by reading out a program for implementing each control module stored in the ROM 112 or the storage 114 into the RAM 113, and executing the read-out program. In the present exemplary embodiment, processing including print processing as well as data transmission and reception processing is implemented by cooperation with hardware for implementing each I/F and each function.

The flowchart in FIG. 5 illustrates processing about transmission and reception of the attribute information in the MFP 101. In S501, the CPU 111 determines whether an attribute information acquisition request is received from an external terminal, such as the communication apparatus 102a or 102b. If the attribute information acquisition request is received from the external terminal (YES in S501), the processing proceeds to S502. If the attribute information acquisition request is not received from the external terminal (NO in S501), the CPU 111 waits for the request.

In S502, the CPU 111 determines whether the attribute information acquisition request is received in S501 via an encrypted communication path. If the attribute information acquisition request is received via a communication path encrypted by a protocol, such as TLS/SSL (YES in S502), the processing proceeds to S503. If the attribute information acquisition request is received via an unencrypted communication path (NO in S502), the processing proceeds to S504.

In S503, the CPU 111 generates attribute information including information indicating that the PIN printing function is supported. The attribute information generated at this time is, for example, the attribute information described with reference to FIG. 4B. On the other hand, in S504, the CPU 111 generates attribute information including information indicating that the PIN printing function is not supported. The attribute information generated at this time is, for example, the attribute information described with reference to FIG. 4A.

In S505, the CPU 111 transmits the attribute information generated in S503 or S504, as a response to the attribute information acquisition request received from the external terminal. Upon completion of the transmission, the series of operations of the processing ends.

Next, reception of print data and print processing in the MFP 101 will be described with reference to the flowchart in FIG. 6.

In S601, the CPU 111 determines whether print data is received via the network 100. If the print data is received (YES in S601), the processing proceeds to S602. If the print data is not received (NO in S601), the processing proceeds to S606.

In S602, the CPU 111 determines whether a setting indicating execution of the PIN printing is included in the print attribute of the received print data. If the setting indicating execution of the PIN printing is included in the print attribute of the received print data (YES in S602), the processing proceeds to S603. If the setting indicating execution of the PIN printing is not included in the print attribute of the received print data (NO in S602), the processing proceeds to S609.

In S603, the CPU 111 determines whether security about the PIN printing is maintained. In a case where a PIN code attached to the print data is hashed by a method supported by the MFP 101, or in a case where the print data is received via an encrypted communication path, the CPU 111 determines that the security about the PIN printing is maintained. On the other hand, in a case where the print data is received via an unencrypted communication path, and the PIN code attached to the print data is plaintext, the CPU 111 determines that the security about the PIN printing is not maintained. If the CPU 111 determines that the security about the PIN printing is maintained (YES in S603), the processing proceeds to S604. If the CPU 111 determines that the security about the PIN printing is not maintained (NO in S603), the processing proceeds to S605.

In S604, the CPU 111 stores the received print data into a storage area for PIN printing. Upon completion of the storage, the processing returns to S601. On the other hand, in S605, the CPU 111 abandons deletes) the received print data, and the processing returns to S601. This processing can achieve control for not performing printing based on PIN printing, in a case where the entire data is not encrypted and a PIN code is transmitted in plaintext for this PIN printing.

Next, execution of the PIN printing will be described. In S606, the CPU 111 determines whether a user instruction for executing the PIN printing is received. For example, in a case where the CPU 111 detects a user operation for selecting a display item to perform the PIN printing from a menu screen (not illustrated) displayed on the operation unit 116, the CPU 111 determines that the user instruction for executing the PIN printing is received (YES in S606), and the processing proceeds to S607. On the other hand, in a case where the CPU 111 does not detect a user operation for selecting a display item to perform the PIN printing, the CPU 111 determines that the user instruction for executing the PIN printing is not received (NO in S606), and the processing proceeds to S610.

In S607, the CPU 111 receives an input of a PIN code. More specifically, the CPU 111 displays a selection screen on the operation unit 116 so that a user can select data to be printed from pieces of print data stored in the storage area for PIN printing of the storage 114. Further, upon receiving a user operation for selecting the print data, the CPU 111 displays an input screen for inputting a PIN code. When an OK key is pressed after the PIN code is input via the input screen, the processing proceeds to S608.

In S608, the CPU 111 determines whether a PIN code attached as a "job-password" attribute of the print data and the PIN code input in S607 match with each other. In a case where the PIN code attached to the print data is not hashed (i.e., in a case where the PIN code is plaintext), the CPU 111 determines whether the PIN code attached to the print data and the input PIN code match with each other. On the other hand, in a case where the PIN code attached to the print data is hashed, the CPU 111 determines whether the hash value of the attached PIN code and a hash value determined by hashing the PIN code input in S607 using a hash algorithm, such as SHA-2 match with each other. The type of the hash algorithm is determined based on a print attribute of "job-password-encryption" attached to the print data. If the PIN code (or the hash value of the PIN code) attached to the print data and the PIN code (or the hash value of the PIN code) input in S607 match with each other (YES in S608), the processing proceeds to S609. On the other hand, if the PIN code (or the hash value of the PIN code) attached to the print data and the PIN code (or the hash value of the PIN code) input in S607 do not match with each other (NO in S608), the processing returns to S607, and then, the CPU 111 waits for re-entry of the PIN code.

In S609, the CPU 111 executes print processing, in cooperation with the image processing unit 124 and the printing unit 120. The CPU 111 generates a print image based on the print data, in cooperation with the image processing unit 124. The generated print image is transferred to the printing unit 120, and the printing unit 120 executes printing on a sheet, so that a print product is output to a sheet output tray (not illustrated).

On the other hand, in S610, the CPU 111 determines whether an instruction for power off is received. If the instruction for power off is received (YES in S610), the series of operations of the processing ends. On the other hand, if the instruction for power off is not received (NO in S610), the processing returns to S601, and the CPU 111 waits for reception of print data or reception of a user operation.

In the present exemplary embodiment, the PIN printing function is described as an example of the authentication printing function, but the authentication printing function is not limited to this example. For example, a password can be used in place of the PIN code. A rule that defines whether to use the password or the PIN code for authentication can be set, for example, using an operation of "job-password-repertoire-supported" defined by the Printer Working Group (PWG). In a case where the MFP 101 uses the PIN code for authentication, the MFP 101 may designate "iana_us-ascii_digits" indicating that a password is formed of only numbers (0x30 to 0x39) of American Standard Code for Information Interchange (ASCII) characters. In a case where the MFP 101 uses the password for authentication, the MFP 101 may designate "iana_us-ascii_complex".

As described above, according to the present exemplary embodiment, availability of the authentication printing function to be notified to a client can be varied depending on whether a communication path between apparatuses is encrypted. Therefore, the flow of a plaintext password on an unencrypted communication path can be prohibited and thus the security level can be increased.

In addition, in the present exemplary embodiment, in a case where print data is received via an unencrypted communication path and in a case where a password of the authentication printing function attached to this print data is not hashed, this print data is abandoned. Therefore, it is possible to avoid execution of printing based on print data having a possibility that a password is leaked to a third party. Hence, the security level can be increased.

In the first exemplary embodiment, there is described the mechanism for varying the availability of the authentication printing function to be notified to a client, depending on whether a communication path between apparatuses is encrypted.

An MFP 101 according to a second exemplary embodiment varies availability of an authentication printing function, depending on the type of a print client at the other end of communication, in addition to the first exemplary embodiment. The second exemplary embodiment focuses on the presence of a print client that does not support hashing of a password to be used for the authentication printing function and a print client that supports hashing of a password to be used for the authentication printing function. In the print client that supports hashing of a password to be used for the authentication printing function, a password for authentication printing is hashed and the hashed password is transmitted, even in a case where print data is transmitted via an unencrypted communication path. In other words, the print client that supports hashing of a password does not transmit the password in plaintext via an unencrypted communication path. In view of this point, in the second exemplary embodiment, control of the MFP 101 is performed so that the availability of the authentication printing function to be notified to a print client is varied based on the type or version of the print client, in addition to the control according to the first exemplary embodiment.

In the second exemplary embodiment, a hardware configuration of each of apparatuses is similar to the hardware configuration in the first exemplary embodiment. The configuration similar to the configuration in the first exemplary embodiment will not be described in detailed.

Figure 7:
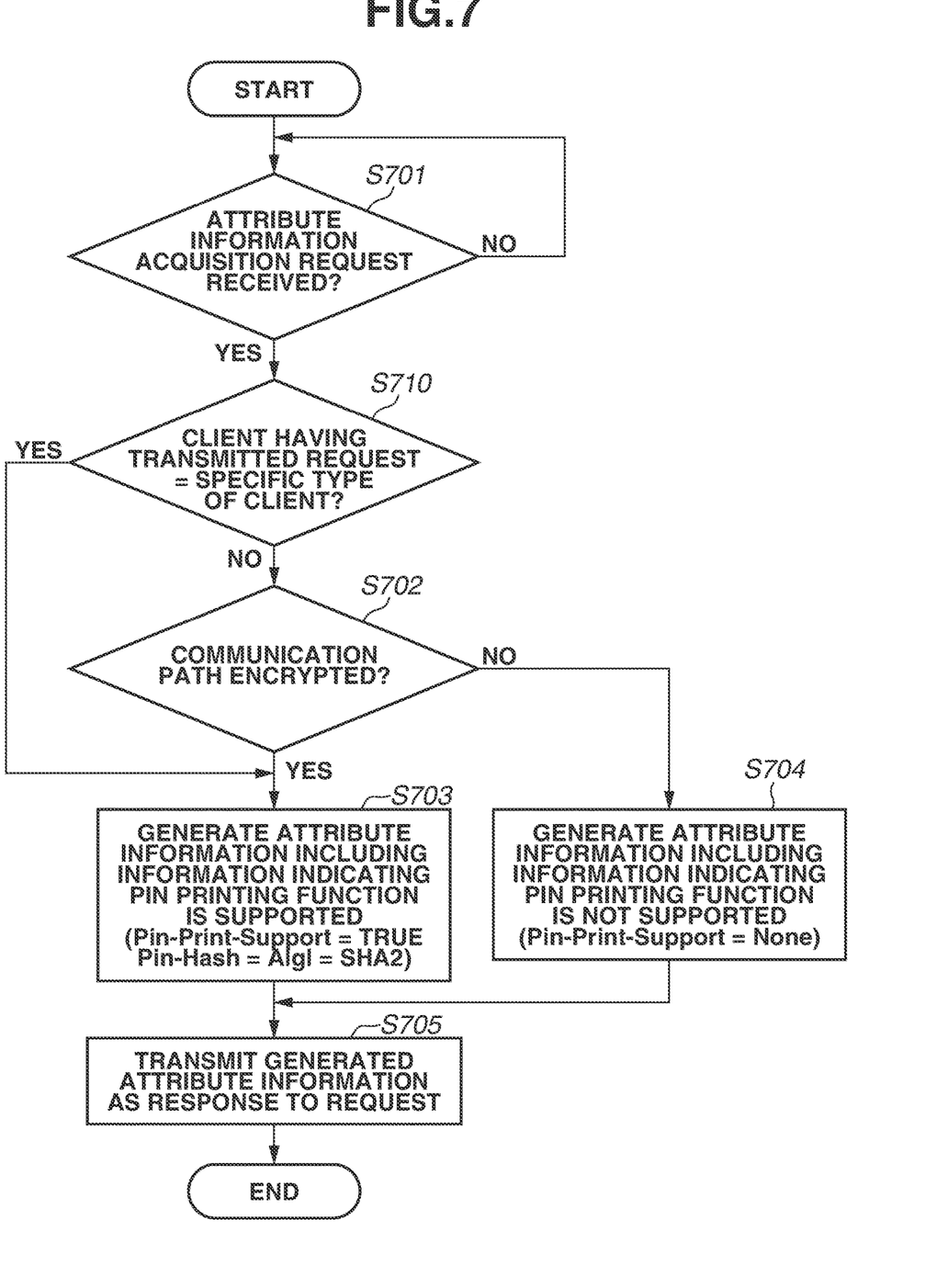
FIG. 7 is a flowchart illustrating an example of a control method performed by the MFP.

FIG. 7 is a flowchart illustrating processing about transmission and reception of attribute information in the MFP 101, executed in place of the flowchart of FIG. 5 described in the first exemplary embodiment. In addition to the operations in the flowchart of FIG. 5, S710 for determining the type of a print client is provided.

In S701, a CPU 111 determines whether an attribute information acquisition request is received, in a manner similar to S501. If the attribute information acquisition request is received (YES in S701), the processing proceeds to S710. If the attribute information acquisition request is not received (NO in S701), the processing returns to S701.

In S710, the CPU 111 determines whether a print client that has transmitted the attribute information acquisition request is a specific type of client. If the CPU 111 determines that the print client that has transmitted the attribute information acquisition request is the specific type of client (YES in S710), the processing proceeds to S703. On the other hand, if the CPU 111 determines that the print client that has transmitted the attribute information acquisition request is not the specific type of client (NO in S710), the processing proceeds to S702.

At this time, the attribute information acquisition request (Get-Printer-Attributes command) in IPP is transmitted in compliance with the method of Hyper Text Transfer Protocol (HTTP). The CPU 111 analyzes HTTP header information included in an HTTP request for acquisition of attribute information of a printer, and the CPU 111 acquires User-Agent information of a print client that has transmitted the HTTP request. Information that differs based on the type or version of a print client is described as the User-Agent information included in the HTTP request. Subsequently, the CPU 111 determines whether the print client that has transmitted the request is the specific type of client, based on the acquired User-Agent information. The specific type of print client is assumed to be a client that meets such a condition that hashing of a password of authentication printing is supported is confirmed beforehand. More specifically, a storage 114 of the MFP 101 stores a list of pieces of User-Agent information each corresponding to a print client for which hashing of a password of authentication printing is supported is confirmed beforehand. If the acquired User-Agent information is included in this list, the CPU 111 determines that the print client is the specific type of client. On the other hand, if the acquired User-Agent information is not included in this list, the CPU 111 determines that the print client is not the specific type of client. In the present exemplary embodiment, the case where a whitelist is used is described as an example, but the present exemplary embodiment is not limited to this example. Whether the print client is the specific type of client can also be determined based on a blacklist that lists pieces of User-Agent information each corresponding to a print client for which hashing of a password is not supported is confirmed beforehand.

Processing performed in S702 to S705 is similar to the processing performed in S502 to S505 described in the first exemplary embodiment, respectively, and thus will not be described.

According to the second exemplary embodiment described above, it is possible to vary the availability of the authentication printing function depending on the type of the print client at the other end of communication, in addition to performing the control according to the first exemplary embodiment. Therefore, if the print client supports hashing of a password to be used for the authentication printing function, the authentication printing function can be used even via an unencrypted communication path.

Other Embodiments

Some embodiments can also be realized by a computer of a system or apparatus that reads out and executes computer-executable instructions recorded on a storage medium (e.g., non-transitory computer-readable storage medium) to perform the functions of one or more of the above-described embodiment(s), and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2018-077926, which was filed on Apr. 13, 2018 and which is hereby incorporated by reference herein in its entirety.

What is claimed is:

1. A printing apparatus, comprising:
at least one processer and at least one memory in communication with the at least one processor and having stored thereon instructions that, when executed by the at least one processor, cause the at least one processor and the at least one memory to cooperate to act as:
a reception control unit configured to receive a request for acquisition of attribute information of the printing apparatus from a communication apparatus; and
a transmission control unit configured to perform control so as to transmit, to the communication apparatus, attribute information that includes at least information indicating that authentication printing using a password is supported, in response to a reception of a request for acquisition of the attribute information of the printing apparatus from the communication apparatus via an encrypted communication path, as a response to the request, and configured to perform control so as to transmit, to the communication apparatus, attribute information that includes at least information indicating that the authentication printing is not supported, in response to a reception of at least a request for acquisition of the attribute information of the printing apparatus from the communication apparatus via an unencrypted communication path, as a response to the request.

2. The printing apparatus according to claim 1, wherein the instructions, when executed by the at least one processor, further cause the at least one processor and the at least one memory to cooperate to act as a determination unit configured to determine whether the request for acquisition of the attribute information of the printing apparatus is transmitted via an encrypted communication path.

3. The printing apparatus according to claim 1, wherein the transmission control unit performs control so as to transmit attribute information that includes at least the information indicating that authentication printing using a password is supported, and information indicating a hash algorithm to be used for hashing of a password, in response to a request for acquisition of the attribute information of the printing apparatus from the communication apparatus via an encrypted communication path, as a response to the request.

4. The printing apparatus according to claim 3, wherein the transmission control unit performs control so as to, in a case where a print client of the communication apparatus that has transmitted the request is a print client that meets a specific condition, transmit, to the communication apparatus, the attribute information that includes at least the information indicating that authentication printing using a password is supported, and the information indicating the hash algorithm to be used for hashing of a password even in a case where a request for acquisition of the attribute information of the printing apparatus is received from the communication apparatus via an unencrypted communication path.

5. The printing apparatus according to claim 4, wherein the instructions, when executed by the at least one processor, further cause the at least one processor and the at least one memory to cooperate to act as a second determination unit configured to determine whether the print client of the communication apparatus is a print client that meets a specific condition, based on User-Agent information included in a request received from the print client.

6. The printing apparatus according to claim 1, wherein the instructions, when executed by the at least one processor, further cause the at least one processor and the at least one memory to cooperate to act as:
 a second reception control unit configured to perform control so as to receive print data; and
 a print control unit configured to perform control so as to prohibit execution of printing based on the received print data, in a case where print data in which authentication printing is set is received via an unencrypted communication path, and a password of the authentication printing included in the print data is not hashed.

7. A control method for a printing apparatus, the control method comprising:
 performing reception control so as to receive a request for acquisition of attribute information of the printing apparatus from a communication apparatus; and
 performing transmission control so as to transmit, to the communication apparatus, attribute information that includes at least information indicating that authentication printing using a password is supported, in response to a reception of a request for acquisition of the attribute information of the printing apparatus from the communication apparatus via an encrypted communication path, as a response to the request, and performing transmission control so as to transmit attribute information that includes at least information indicating that the authentication printing is not supported, in response to a reception of at least a request for acquisition of the attribute information of the printing apparatus from the communication apparatus via an unencrypted communication path, as a response to the request.

8. A non-transitory storage medium storing a program for causing a computer to execute operations comprising:
 performing reception control so as to receive a request for acquisition of attribute information of the printing apparatus from a communication apparatus; and
 performing transmission control so as to transmit, to the communication apparatus, attribute information that includes at least information indicating that authentication printing using a password is supported, in response to a reception of a request for acquisition of the attribute information of the printing apparatus from the communication apparatus via an encrypted communication path, as a response to the request, and performing transmission control so as to transmit attribute information that includes at least information indicating that the authentication printing is not supported, in response to a reception of at least a request for acquisition of the attribute information of the printing apparatus from the communication apparatus via an unencrypted communication path, as a response to the request.

* * * * *